(12) United States Patent
Kilburn et al.

(10) Patent No.: US 8,229,685 B2
(45) Date of Patent: Jul. 24, 2012

(54) TWO-PHASE FLUID FLOW MEASURING APPARATUS AND PROCESS

(75) Inventors: Thomas Edward Kilburn, Pennsburg, PA (US); Michael D. Newman, Hillsborough, NJ (US)

(73) Assignee: Linde Aktiengesellschaft (DE)

( * ) Notice: Subject to any disclaimer, the term of this patent is extended or adjusted under 35 U.S.C. 154(b) by 409 days.

(21) Appl. No.: 12/609,195

(22) Filed: Oct. 30, 2009

(65) Prior Publication Data
US 2011/0106462 A1    May 5, 2011

(51) Int. Cl.
*G01F 1/74* (2006.01)
(52) U.S. Cl. .............................. 702/47; 355/30; 430/113
(58) Field of Classification Search .................. 702/45, 702/47, 50, 130, 138, 142, 156, 183; 355/30; 356/51; 430/112, 113, 115; 73/204.23, 861.04
See application file for complete search history.

(56) References Cited

U.S. PATENT DOCUMENTS

| 2008/0003516 A1* | 1/2008 | Akioka et al. | 430/113 |
| 2011/0013159 A1* | 1/2011 | Kramer et al. | 355/30 |

* cited by examiner

*Primary Examiner* — John H Le
(74) *Attorney, Agent, or Firm* — Joshua L. Cohen

(57) ABSTRACT

An apparatus for measuring a flow rate of a two-phase fluid flowing within a conduit includes a chamber having at least one transparent wall in fluid communication with the conduit; a high-speed imaging system in visual communication with the at least one transparent wall; a thermocouple and a pressure transducer for obtaining a temperature value and a pressure value of the two-phase fluid flowing within the conduit; and a processor for determining the flow rate of the two-phase fluid by analyzing the images obtained by the high-speed imaging system, and from the temperature and pressure values for the two-phase fluid flowing within the conduit. A process is provided for determining the flow rate of a two-phase fluid flowing within the conduit.

20 Claims, 1 Drawing Sheet

TWO-PHASE FLUID FLOW MEASURING APPARATUS AND PROCESS

TECHNICAL FIELD

The present apparatus measures the flow of a two-phase fluid through a conduit.

Devices have been developed to measure the flow of fluid through a conduit. Such devices can be quite complex. The devices may consist of numerous components which can be invasive to the conduit or the flow of the fluid, or may utilize devices which measure the electromagnetic properties of the fluid within the conduit. For these reasons, the devices can be costly to manufacture, install and maintain, and may impose undue burdens on the flow of the fluid within the conduit. In addition, no known device has been developed that will accurately measure two-phase cryogenic fluid flow.

What is needed is an apparatus to measure the flow of the two-phase fluid, such as a two-phase cryogenic fluid, which does not impose an undue burden on the flow of the two-phase fluid and which can be easily installed and maintained.

DESCRIPTION

An apparatus is provided for measuring a flow rate of a two-phase fluid flowing within a conduit comprising a chamber having at least one transparent wall in fluid communication with the conduit; a high-speed imaging system in visual communication with the at least one transparent wall; means for obtaining a temperature value and a pressure value of the two-phase fluid flowing within the conduit; and means for determining the flow rate of the two-phase fluid by analyzing the images obtained by the high-speed imaging system, and from the temperature value and the pressure value for the two-phase fluid flowing within the conduit.

Also provided is an apparatus for measuring the percentage of a two-phase fluid flowing within a conduit which is either a gas or a solid particulate material, comprising a chamber having at least one transparent wall in fluid communication with the conduit; a high-speed imaging system in visual communication with the at least one transparent wall; and means for determining the percentage of the two-phase fluid which is either a gas or a solid particulate material by analyzing the images obtained by the high-speed imaging system.

The two-phase fluid may comprise a transparent fluid having a liquid phase and a gas phase, such as a mixture of liquid and gaseous nitrogen or a mixture of water and steam. The two-phase fluid may alternatively comprise a transparent fluid having a liquid phase with solid particulate material dispersed therein. The transparent wall may comprise at least one vacuum-insulated wall.

In further embodiments, the chamber may comprise first and second opposing transparent walls. The chamber may comprise a flattened conduit having a cross-sectional flow area which has a rectangular, round, elliptical, ovaloid, or racetrack shape. The high-speed imaging system may comprise a light source positioned at the first opposing transparent wall of the conduit and a high-speed imaging device positioned at the second opposing transparent wall of the conduit. The high-speed imaging device may be capable of capturing up to 1000 frames per second ("fps") and perhaps more.

In yet a further embodiment, the means for determining the flow rate of the two-phase fluid may comprise a processor in direct or indirect electronic communication with the high-speed imaging system and the means for obtaining the temperature and the pressure values of the two-phase fluid within the conduit.

Figure 1:
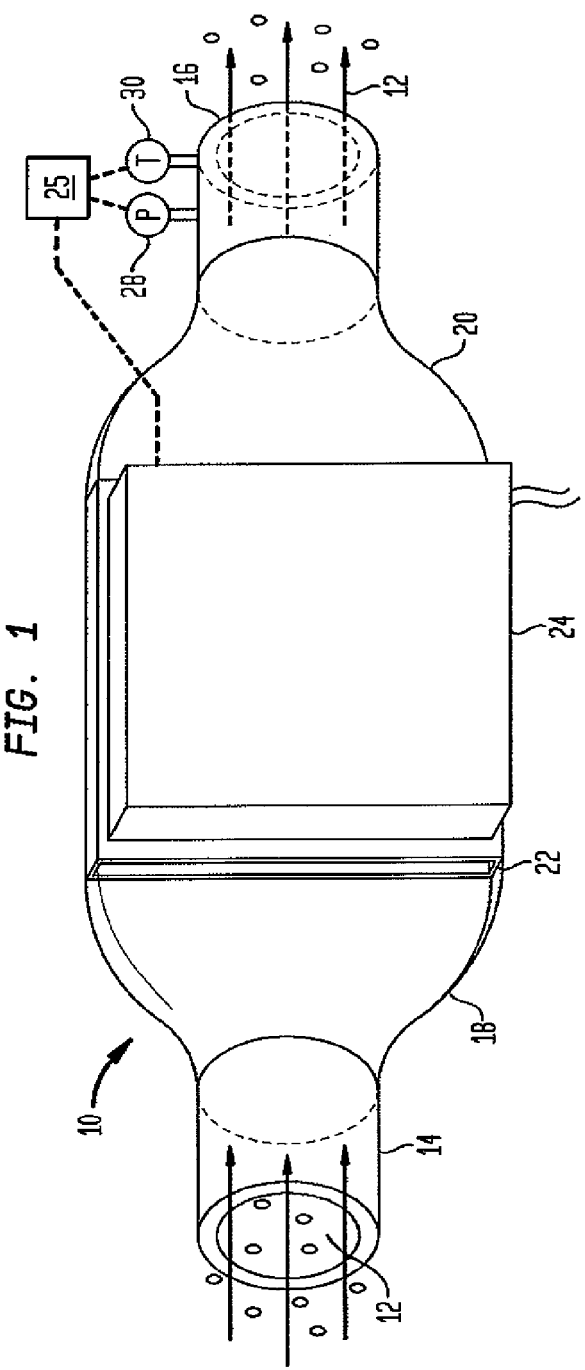
FIG. 1 is a schematic side elevational view of one embodiment of a two-phase fluid flow measuring apparatus.
Figure 2:
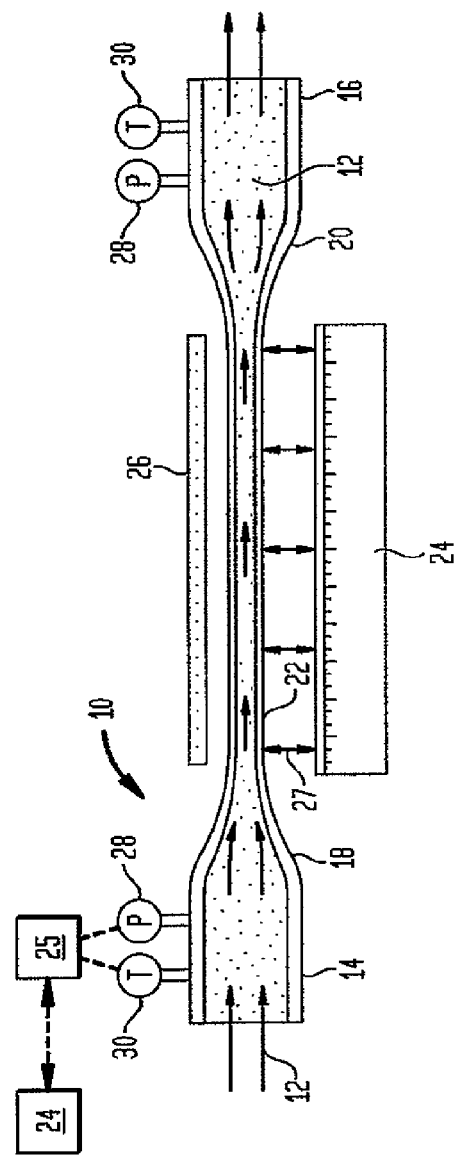
FIG. 2 is a schematic top plan view of one embodiment of a two-phase fluid flow measuring apparatus.

Referring to FIGS. 1 and 2, in a particular exemplary embodiment, the two-phase fluid flow measuring apparatus 10 comprises an inlet conduit 14 or inlet through which the two-phase fluid 12 flows into the apparatus 10, a round-to-flat (or circular-to-planar) transition section 18, a chamber 22 comprising in this embodiment a flat transparent section, a flat-to-round (or planar-to-circular) transition section 20, and an outlet conduit 16 or outlet through which the two-phase fluid 12 exits the apparatus 10. The chamber 22 is disposed between and interconnects the inlet 14 and the outlet 16. The apparatus 10 may further comprise a high-speed imaging device 24 and a light source 26 positioned at opposite sides of the chamber 22, as well as a pressure transducer 28 and a thermocouple probe 30, both of which are engaged or in communication with the inlet conduit 14 and/or the outlet conduit 16 in a manner such that the pressure and temperature of the two-phase fluid 12 flowing through the inlet conduit 14 and/or the outlet conduit 16 can be ascertained. The pressure transducer 28 and thermocouple probe 30 may penetrate to an interior of the inlet conduit 14 and/or the outlet conduit 16 in order to ascertain the pressure and temperature of the two-phase fluid 12.

The apparatus additionally comprises analyzing means 25 for determining the flow rate of the two-phase fluid by analyzing the images obtained by the high-speed imaging system, and from the temperature and the pressure values for the two-phase fluid flowing within the conduit 14, 16. The analyzing means 25 are in direct or indirect electrical communication with the high-speed imaging device 24, the pressure transducer 28 and the thermocouple probe 30. See for example FIG. 1. In certain embodiments, the analyzing means 25 may comprise a processor. The processor is capable of receiving and/or processing digital information about the images obtained or captured by the high-speed imaging system; receiving the temperature and pressure measurements from the thermocouple probe 30 and the pressure transducer 28; performing the calculations, as described herein, which are necessary to determine the flow rate; and communicating the flow rate to persons operating the apparatus 10 or other computer systems which monitor the apparatus. Such processors are commercially available.

The two-phase fluid 12 is typically a transparent fluid in which bubbles of the gas-phase portion of the two-phase fluid 12 can be visually detected. However, the two-phase fluid 12 may also comprise a suspension of solid particles in a liquid, such as embodiments wherein the liquid is transparent and the solid particles may be visually detected. The two-phase fluid 12 may flow through the apparatus 10 in a substantially laminar flow, i.e. a smooth flow with little or no turbulence. The two-phase fluid 12 may be a two-phase mixture of cryogenic nitrogen, cryogenic oxygen, cryogenic carbon dioxide, or other such cryogenic fluids, or mixtures thereof.

The inlet conduit 14, round-to-flat transition section 18, flat-to-round transition section 20, and outlet conduit 16 can be made of any suitable conduit material, such as metals or polymeric materials. In certain embodiments, the material may need to be able to withstand pressures of about 30 psi (207 kPa) or higher, and/or cryogenic temperatures as low as about −300° F. (−184° C.).

The chamber 22 of the apparatus 10 may be made of any suitable transparent material, such as glass or a polymeric material. The chamber 22 may be vacuum-insulated, in that the walls of the section comprise two layers of transparent material between which an evacuated space is provided. The vacuum insulation provides thermal insulation such that thermal loss of the two-phase fluid 12 flowing through the chamber 22 is reduced. The transparent section is adapted to prevent moisture in room or ambient air from condensing on the transparent material surfaces of the chamber 22.

The pressure transducer 28 may be any known device which is capable of ascertaining the pressure of a fluid flowing through a conduit. The thermocouple probe 30 may be any known device which is capable of ascertaining the temperature of a fluid flowing through a conduit.

The high speed imaging system of the present apparatus may comprise any commercially available high-speed imaging device capable of capturing at least about 100 fps, and may or may not comprise a separate light source. Arrows 27 indicate the spatial direction of the pictures or images being taken, which may be from 100 fps up to 1,000 fps, and perhaps more. As the apparatus is exemplified in FIGS. 1 and 2, the high-speed imaging system comprises a light source 26 and a high-speed imaging device 24, which are positioned from each other at opposite sides of the chamber 22. The light source 26 ensures that the images taken by the high-speed imaging device 24 are consistent, so that they may be analyzed efficiently. The images may be analyzed by known techniques to determine the physical characteristics of the two-phase fluid 12 flowing through the apparatus 10. Without limitation, a suitable high-speed imaging system is the CV-2100™ Series high-speed digital machine vision system available from Keyence® Corporation of America (Woodcliff Lake, N.J.).

Also provided is a process for determining a flow rate of a two-phase fluid flowing within a conduit having a cross-sectional flow area, comprising measuring a percentage of the two-phase fluid which is in a gas phase; determining a percentage of the two-phase fluid which is in a liquid phase; measuring a velocity of the two-phase fluid flowing within the conduit; measuring a temperature and a pressure of the two-phase fluid flowing within the conduit; and determining a flow rate of the two-phase fluid based upon the temperature and the pressure of the two-phase fluid, the gas phase and liquid phase percentages of the two-phase fluid, the velocity of the two-phase fluid flowing within the conduit, and the cross-sectional flow area of the conduit. In certain embodiments, the process may comprise measuring a percentage of a two phase fluid which is partially in a solid phase.

Further provided is a process for determining a flow rate of a two-phase fluid flowing within a conduit having a cross-sectional flow area, comprising providing an apparatus for measuring a flow rate of a two-phase fluid flowing through a conduit comprising a chamber having at least one transparent wall in fluid communication with the conduit; a high-speed imaging system in visual communication with the at least one transparent wall; means for obtaining a temperature value and a pressure value of the two-phase fluid flowing within the conduit; and means for determining the flow rate of the two-phase fluid by analyzing the images obtained by the high-speed imaging system, and from the temperature and the pressure values for the two-phase fluid flowing within the conduit; utilizing the high-speed imaging system to capture information relating to measuring a percentage of the two-phase fluid which is in a gas phase and a velocity of the two-phase fluid within the conduit; determining a percentage of the two-phase fluid which is in a liquid phase; utilizing the means for determining the temperature and the pressure of the two-phase fluid to measure the temperature and the pressure of the two-phase fluid within the conduit; and utilizing the means for determining the flow rate of the two-phase fluid to determine the flow rate of the two-phase fluid based upon the temperature value and the pressure value, the gas phase and/or liquid phase percentages of the two-phase fluid, the velocity of the two-phase fluid flowing within the conduit, and the cross-sectional flow area of the conduit.

The process may utilize the high-speed imaging system to capture a series of images of the two-phase fluid flowing through the chamber 22, and the high-speed imaging system may be capable of capturing 1000 images per second, and perhaps more.

In a further embodiment of the process utilizing the subject apparatus 10, determining the flow rate of the two-phase fluid comprises calculating the mass flow rate using the following formula:

$$M=Q(Ll_L+Gl_G)$$

wherein M is the mass flow rate, Q is the velocity of the two phase fluid multiplied by the cross-sectional flow area of the conduit, L is the percentage of the two-phase fluid which is in the liquid phase, G is the percentage of the two-phase fluid which is in the gas phase, $l_L$ is the density of the portion of the two-phase fluid which is in the liquid phase, and $l_G$ is the density of the portion of the two-phase fluid which is in the gas phase, wherein $l_L$ and $l_G$ can be determined through the use of thermodynamic look-up tables containing the temperature and the pressure of the specific two-phase fluid. Such look-up tables are referenced in Perry's Chemical Engineering Handbook for example, and may be contained in a software database resident on a computer.

The means for determining the flow rate of the two-phase fluid may comprise a processor, such as discussed above with reference to the analyzing means 25, in direct or indirect electronic communication with the high-speed imaging system and with the means for obtaining the temperature and the pressure values of the two-phase fluid flowing within the conduit. The processor can be integrated with the apparatus, or may be resident in a computer network or a stand-alone computer.

EXAMPLE

A two-phase nitrogen stream is provided to the apparatus 10 as described above, comprising liquid and gaseous nitrogen. As the two-phase nitrogen flows through the transparent chamber 22 of the apparatus, the volumetric flow rate (Q) of the nitrogen stream is determined by multiplying the velocity of the nitrogen stream (V) by the area of flow (A), which is determined by multiplying the height and width of the cross-sectional flow area of the transparent chamber. The mass flow rate (M) is determined by the following formula:

$$M=Q(Ll_L+Gl_G)$$

wherein M is the mass flow rate, Q is the volumetric flow rate as described above, L is the percentage of the two-phase fluid which is in the liquid phase, G is the percentage of the two-phase fluid which is in the gas phase, $l_L$ is the density of the portion of the two-phase fluid which is in the liquid phase, and $l_G$ is the density of the portion of the two-phase fluid which is in the gas phase, wherein $l_L$ and $l_G$ can be determined through the use of thermodynamic look-up tables containing the temperature and the pressure of the specific two-phase fluid.

In this illustrative example, the cross-sectional flow area (A) is 0.0417 ft² (0.00387 m²) (the area being 1 ft (0.3048 m)

tall by 0.0417 ft (0.0127 m) wide). The velocity (V) of the nitrogen stream is determined to be 10 ft/min (3.048 m/min) by utilizing the high-speed imaging system to determine the average velocity of the bubbles flowing within the nitrogen stream by comparing a series of images captured at a known number of frames per second. The area of the images taken by the high-speed imaging device 24 is 1 ft$^2$ (0.0929 m$^2$) (the imaging area being 1 ft (0.3048 m) wide by 1 ft (0.3048 m) tall), and the average percentage of that area which is found to be bubbles is found to be 1%, assuming each bubble extends the width of the chamber (½ in. or 1.27 cm). Thus, the percentage of the two-phase fluid which is in the gas phase is 1% (G=0.01), and the percentage of the two-phase fluid which is in the liquid phase is 99% (L=1−G=0.99).

The temperature and pressure of the nitrogen stream are determined to be 31 300.9° F. (−184.9° C.) and 30 psig (207 kPa), respectively, using a thermocouple probe 30 and a pressure transducer 28, both of which are engaged with the outlet conduit. From the temperature and pressure of the nitrogen stream, the density of the liquid phase portion of the stream is determined to be 47.16 lb/ft$^3$ (755.4 kg/m$^3$) and the density of the gas phase portion of the stream is determined to be 0.736 lb/ft$^3$ (11.8 kg/m$^3$) using thermodynamic look-up tables for nitrogen. Thus, Q being equal to V times A, the mass flow rate (M) can be calculated as follows:

$$M = Q(Ll_L + Gl_G) = (10)(0.0417)((0.99)(47.16) + (0.01)(0.736))$$

giving the result of M=19.47 lb/min (8.831 kg/min).

The apparatus and process for measuring a flow rate of a two-phase fluid flowing through a conduit are useful in commercial and industrial processes in which a fluid is to be delivered at a specific temperature and/or pressure conducive to the fluid existing in two phases, including by not limited to refrigeration, separation, distillation, large-scale chemical reaction, or refining. The apparatus and process can be used with any transparent fluid, such as a liquid having gas bubbles entrained in the flow of the liquid, such as for example when the fluid flow includes water and steam.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. An apparatus for measuring a flow rate of a two-phase fluid flowing within a conduit comprising:
    a chamber having at least one transparent wall in fluid communication with the conduit;
    a high-speed imaging system in visual communication with the at least one transparent wall;
    means for obtaining a temperature value and a pressure value of the two-phase fluid flowing within the conduit; and
    means for determining the flow rate of the two-phase fluid by analyzing images obtained by the high-speed imaging system, and from the temperature value and the pressure value for the two-phase fluid flowing within the conduit.

2. The apparatus of claim 1, wherein the two-phase fluid comprises a transparent fluid.

3. The apparatus of claim 1, wherein the two-phase fluid comprises a liquid phase and a gas phase.

4. The apparatus of claim 3, wherein the two-phase fluid comprises liquid and gaseous nitrogen.

5. The apparatus of claim 1, wherein the two-phase fluid comprises a liquid phase with a solid particulate material dispersed therein.

6. The apparatus of claim 1, wherein the at least one transparent wall comprises at least one vacuum-insulated wall.

7. The apparatus of claim 1, wherein the chamber comprises a flattened conduit having a cross-sectional flow area which has a rectangular, round, elliptical, ovaloid, or racetrack shape.

8. The apparatus of claim 1, wherein the chamber comprises first and second opposed transparent walls.

9. The apparatus of claim 8, wherein the high-speed imaging system comprises a light source positioned at the first opposed transparent wall of the conduit and a high-speed imaging device positioned at the second opposed transparent wall of the conduit.

10. The apparatus of claim 9, wherein the high-speed imaging system is capable of capturing about 100 frames per second or greater.

11. The apparatus of claim 1, wherein the means for determining the flow rate comprises a processor in electronic communication with the high-speed imaging system and the means for obtaining the temperature value and the pressure value.

12. An apparatus for measuring a percentage of a two-phase fluid flowing within a conduit which is either a gas or a solid particulate material, comprising:
    a chamber having at least one transparent wall in fluid communication with the conduit;
    a high-speed imaging system in visual communication with the at least one transparent wall; and
    means for determining the percentage of the two-phase fluid which is either a gas or a solid particulate material by analyzing images obtained by the high-speed imaging system.

13. The apparatus of claim 12, wherein the chamber comprises first and second opposed transparent walls, and the high-speed imaging system comprises a light source positioned at the first opposed transparent wall of the conduit and a high-speed imaging device positioned at the second opposed transparent wall of the conduit.

14. The apparatus of claim 12, wherein the means for determining the percentage of the two-phase fluid which is either a gas or a solid particulate material comprises a processor in electronic communication with the high-speed imaging system.

15. A process for determining a flow rate of a two-phase fluid flowing within a conduit having a cross-sectional flow area comprising:
    measuring a percentage of the two-phase fluid which is in a gas phase;
    determining another percentage of the two-phase fluid which is in a liquid phase;
    measuring a velocity of the two-phase fluid flowing within the conduit;
    measuring a temperature and a pressure of the two-phase fluid flowing within the conduit; and
    determining the flow rate of the two-phase fluid based upon the temperature and the pressure of the two-phase fluid, the gas and the liquid phase percentages of the two-phase fluid, the velocity of the two-phase fluid flowing within the conduit, and the cross-sectional flow area of the conduit.

16. A process for determining a flow rate of a two-phase fluid flowing within a conduit having a cross-sectional flow area comprising:
   providing an apparatus comprising:
      a chamber having at least one transparent wall in fluid communication with the conduit;
      a high-speed imaging system in visual communication with the at least one transparent wall;
      means for obtaining a temperature value and a pressure value of the two-phase fluid flowing within the conduit; and
      means for determining the flow rate of the two-phase fluid by analyzing images obtained by the high-speed imaging system, and from the temperature and the pressure values for the two-phase fluid flowing within the conduit;
   utilizing the high-speed imaging system to capture information relating to measuring a percentage of the two-phase fluid which is in a gas phase and a velocity of the two-phase fluid flowing within the conduit;
   determining another percentage of the two-phase fluid which is in a liquid phase;
   utilizing the means for obtaining the temperature and the pressure of the two-phase fluid to measure the temperature and the pressure values of the two-phase fluid flowing within the conduit; and
   utilizing the means for determining the flow rate of the two-phase fluid to determine the flow rate of the two-phase fluid based upon the temperature value and the pressure value of the two-phase fluid, the gas phase and/or the liquid phase percentages of the two-phase fluid, the velocity of the two-phase fluid flowing within the conduit, and the cross-sectional flow area of the conduit.

17. The process of claim 16, wherein utilizing the high-speed imaging system comprises capturing a series of images of the two-phase fluid flowing through the chamber.

18. The process of claim 17, wherein the high-speed imaging system captures about 100 frames per second or greater.

19. The process of claim 16, wherein determining the flow rate of the two-phase fluid comprises calculating a mass flow rate using the following formula:

$$M = Q(Ll_L + Gl_G)$$

wherein M is the mass flow rate, Q is the velocity of the two-phase fluid multiplied by the cross-sectional flow area of the conduit, L is the percentage of the two-phase fluid which is in the liquid phase, G is the percentage of the two-phase fluid which is in the gas phase, $l_L$ is a density of the portion of the two-phase fluid which is in the liquid phase, and $l^G$ is the density of the portion of the two-phase fluid which is in the gas phase, wherein $l_L$ and $l_G$ is optionally determined through the use of thermodynamic look-up tables containing the temperature and the pressure of the two-phase fluid.

20. The process of claim 16, wherein the means for determining the flow rate of the two-phase fluid comprises a processor in direct or indirect electronic communication with the high-speed imaging system and with the means for obtaining the temperature value and the pressure value of the two-phase fluid flowing within the conduit.

* * * * *